Feb. 19, 1935.    W. C. WILSON ET AL    1,991,533
LACQUER FOR BRUSH APPLICATION AND PROCESS OF MAKING THE SAME
Filed Aug. 2, 1932    2 Sheets-Sheet 1
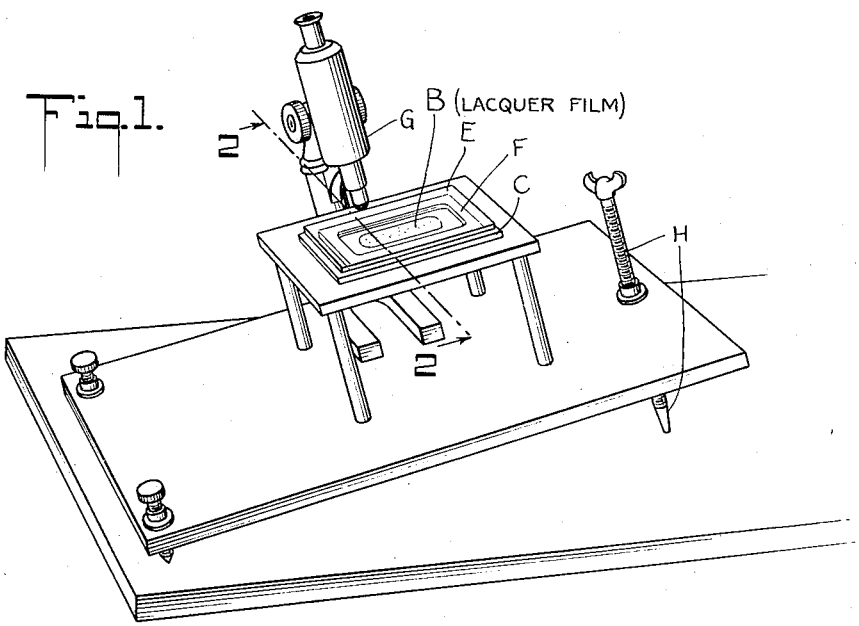
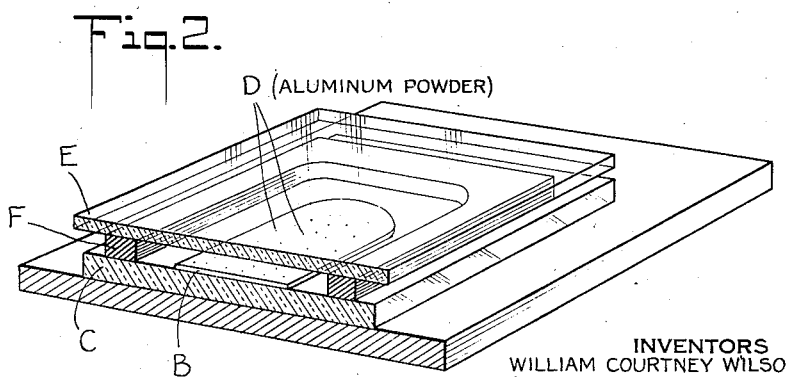
INVENTORS
WILLIAM COURTNEY WILSON
CHARLES ELLIOTT FAWKES.
BY
ATTORNEYS

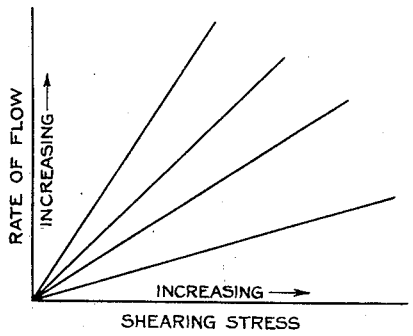
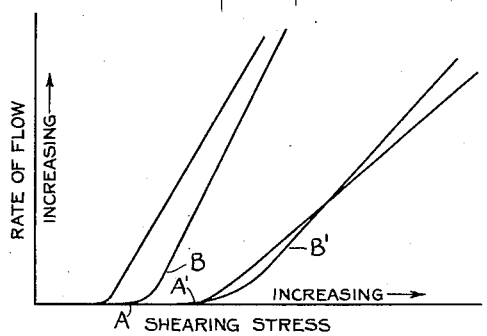
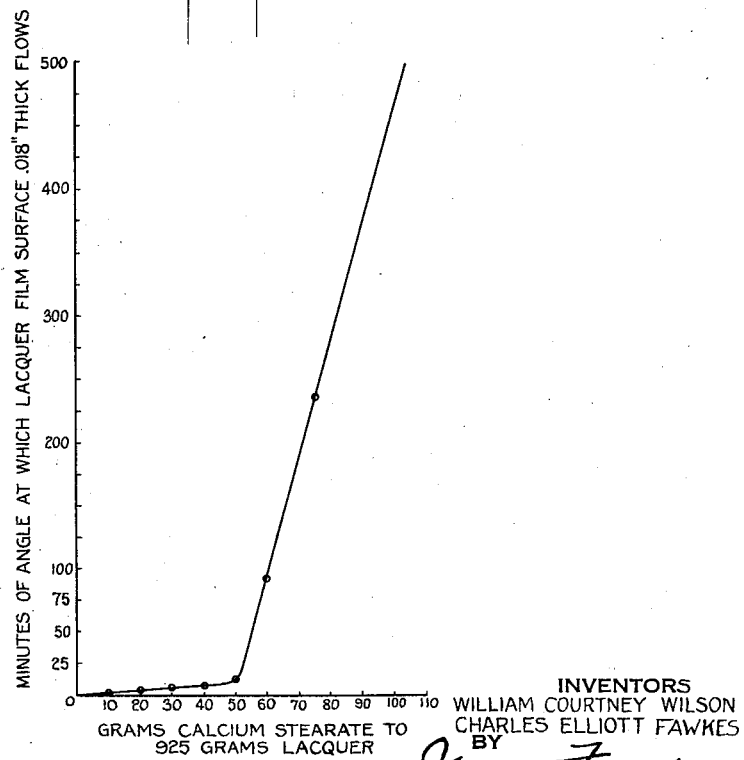

Patented Feb. 19, 1935

1,991,533

UNITED STATES PATENT OFFICE 1,991,533

LACQUER FOR BRUSH APPLICATION AND PROCESS OF MAKING THE SAME

William Courtney Wilson and Charles Elliott Fawkes, Chicago, Ill., assignors to Pyroxylin Products, Incorporated, Chicago, Ill., a corporation of Illinois Application August 2, 1932, Serial No. 627,272

25 Claims. (Cl. 134—79)

This invention relates to improved coating compositions having a cellulose ester or ether base and having plastic as distinct from viscous properties, and relates more particularly to cellulose ester or ether base coating compositions intended to be used for brush application which have definite shear or yield values and which dry at a relatively slow rate, as compared say, to ordinary nitrocellulose lacquers used for spray application.

A prime object of this invention is to provide a lacquer having a cellulose ester or ether base which when applied to vertical surfaces will not sag or run. Another object is to provide a lacquer which dries at a relatively slow rate as compared to ordinary lacquers used for spray work, so that the lacquer may be easily applied by means of a brush.

A particular object of this invention is to provide a lacquer which may be brushed on large surfaces, such as walls, by means of an ordinary paint brush, without the subsequent formation of runs, curtains, sags, and other objectionable changes due to flow of the lacquer between the time it is applied and the time at which it is dry.

A further object of the invention is the production of cellulose ester or ether base lacquers having definite plastic properties of such magnitude as to produce a predetermined yield value, so that in films of normal brushing thickness the lacquer is non-flowing unless a definite force is applied thereto.

Other objects will in part be apparent and in part appear hereinafter.

Cellulose ester and ether base lacquers may be considered essentially as solutions of a cellulose ester such as cellulose nitrate or acetate or ether such as ethyl or benzyl cellulose dissolved in a volatile solvent. Plasticizers or softening agents are added to increase the flexibility and distensibility, and prevent excessive shrinkage of the lacquer film in its final dry condition. Resins both natural and/or synthetic are used to increase the thickness of the film, improve the gloss, increase adherence or for other purposes. Pigments or other coloring agents are added for making lacquer enamels. For most uses, therefore, cellulose ester or ether lacquers may be considered as comprising a cellulose ester or ether, one or more plasticizing or softening agents therefor, and a resin or resins, dissolved in a suitable volatile solvent, with or without pigments or other coloring agents.

A wide variety of compositions containing the above types of ingredients are possible, and are being used as finishing or coating compositions. Ordinarily such compositions are applied by means of a spray gun. Where a spray gun is used, solvents are selected which evaporate rapidly, and the coating dries within a few minutes after being applied. Among the solvents used for ordinary spray lacquers may be mentioned esters, such as ethyl, butyl and amyl acetate; alcohols such as ethyl, butyl, and amyl alcohol, hydrocarbons, toluol, and xylol, petroleum naphtha fractions boiling between 90 and 180° C., the methyl, ethyl and butyl ethers of ethylene glycol, etc. Most of the solvents used in lacquers for spray application boil between 80° and 150° C.

Lacquers for brush application have also been made. Such lacquers have been described by Shipley in U. S. Patent 1,692,584, November 20, 1928, and 1,744,085, January 21, 1930. While such brush lacquers have been used to a considerable extent for finishing small articles which present surfaces having a relatively small area, they have not been satisfactory for general use, especially for finishing relatively large surfaces as for example, walls and ceilings of buildings.

The failure of ordinary brushing lacquers, such as Shipley has described, to find a more general use will be understood from the following explanation of their properties. A cellulose base lacquer composed of a cellulose ester such as cellulose nitrate, a plasticizer and a resin dissolved in a suitable solvent composition either with or without a pigment, is a viscous liquid. The viscosity of the lacquer can be controlled by the quantity and/or type of cellulose nitrate used, and by other means well known in the art. The range of viscosity satisfactory for brushing, however, is somewhat limited, and may be said in general to be below 8 poises. The drying rate can be controlled by the choice of solvents, the use of high boiling, or slow evaporating solvents, producing a slow drying lacquer, while solvents which evaporate quickly produce lacquers, as for example, spray lacquers, which dry very rapidly. For satisfactory brush application, the lacquer should dry at a relatively slow rate, so that the user may have ample time to brush it out on the surface to which it is being applied, and so that after a section of an area has been finished, the lacquer may remain wet for a long enough period to enable the user to brush onto a "wet edge" while finishing the adjacent area, in order to avoid "laps".

When an attempt is made to formulate a lacquer having the desirable characteristics pointed out above, a dilemma is at once encountered. Lacquers, as pointed out above, are viscous liquids, which means that they will flow under any stress, however small the stress may be. The rate of flow is a function of the viscosity, but as stated by Clerk Maxwell and quoted by Bingham in his book "Fluidity and Plasticity", page 216 (McGraw-Hill 1922) "When the very smallest stress, if continued long enough, will cause a constantly increasing change of form, the body must be regarded as a viscous fluid, however hard it may be". As aforesaid, the magnitude of the viscosity of a brushing lacquer is limited, and lacquers having viscosities within this range flow at an appreciable rate. If, therefore, the lacquer is made to dry slowly in order to secure the desirable results described above, it flows excessively when applied to vertical surfaces. This flow, which takes place between the time the lacquer is applied and the time it has dried, results in the formation of "runs", "sags", "curtains", etc. There is thus encountered a dilemma:—If, on the one hand, the lacquer dries fast enough so that there is no appreciable amount of flow between the time it is applied and the time it is dry, the drying rate is too fast for practical brush application on large surfaces. If, on the other hand, the drying rate is sufficiently slow to permit satisfactory brush application, the flow which occurs between the time of application and the time the lacquer is dry results in sags, runs, curtains, etc., in the coating.

We have empirically discovered that the above difficulty may be overcome by the use of an agent or agents which will cause the lacquer to exhibit plasticity. Such an agent we term herein a plasticity producing agent, "plasticity" being defined as hereinafter given. This agent imparts to the lacquer while in the liquid phase the desired plastic properties, said agent having relatively no softening effect on the lacquer film in its final dry condition as distinguished from a "plasticizer", whose principal function is to soften the lacquer film in its final dry condition, as hereinbefore explained. We have ascertained that we can produce a lacquer having plastic properties by the use of heavy metal soaps. Since we have found that the plastic properties are not a truly linear function of the amount of the agent used for producing plastic properties, the amount of agent used is an important part of our invention.

The use of certain metallic soaps as substitutes for transparent or semi-transparent pigments of the type of magnesium carbonate, talc, and china clay for the production of dull or flat lacquers is well known, but so far as we are aware, our method of combining metallic soaps with suitable solvents to produce slow drying celulose derivative lacquers which are non-flowing on vertical films of the normal thickness secured by brush application has never been suggested or used heretofore. In the production of flat or dull lacquers, it is only necessary that there be present a transparent or semi-transparent solid which acts as a pigment, as described, for example by Tight in U. S. Patent 1,756,528, of April 29, 1930. Such materials, however, act merely as pigments to produce a flatting effect after the lacquer has dried, and pigments as such do not produce plastic properties in cellulose derivative lacquers. Our use of soaps to produce plastic properties in the lacquer itself, includes the selection of solvents which will evaporate at a relatively slow rate, and which will hold the cellulose derivative and its modifying agents in solution before and during the drying period, said solvent being also capable of at least partially dissolving and/or forming a jell with the metallic soap or soaps selected, and incorporating in this solution the proper proportion of metallic soap to produce a lacquer having predetermined plastic properties.

To the accomplishment of the foregoing and such other objects as may hereinafter appear, our invention consists in the method, the steps of the method and the coating composition as hereinafter described and sought to be defined in the claims, reference being had to the accompanying drawings in which:

Fig. 1 is a view of a simple apparatus for measuring and determining the degree of plasticity of the coating compositions of our invention.

Fig. 2 is a fragmentary view thereof drawn to an enlarged scale and taken in section through the line 2—2 of Fig. 1, and Figs. 3 to 5 are graphs explaining the principles of our present invention.

In order to determine the degree of plasticity necessary to prevent appreciable flow over a period of several hours, when our improved lacquer is applied to a vertical surface, we have designed a simple apparatus for making such measurements, which is illustrated in Fig. 1 and Fig. 2 of the drawings. A film of lacquer B of definite thickness is placed on a plate glass C, by means of a gauge having a definite thickness and a straight edge (not shown). A few grains of aluminum powder D is sprinkled on top of the lacquer film B, and the film covered with a glass plate E, resting on a rubber gasket F surrounding said film. The plate glass is placed under the objective lens of a microscope G, and tipped by means of a screw device H. A particle of the aluminum powder is observed under the cross hairs of a microscope, while the glass plate holding the lacquer is increasingly inclined by means of the adjustable screw H. The angle of slope at which the lacquer begins to move, as shown by the movement seen under the microscope of aluminum powder thereon, is observed. Since such an instrument is without internal friction, extremely small shearing stresses may be measured.

The rate of flow as observed in the above instrument is a measure of the viscosity. The greatest angle at which no flow occurs is a measure of the plasticity characteristics, and is the limit of perfect elasticity as hereinafter defined. The shearing stress in the above instrument varies with the slope and the thickness of the film. In comparing various materials, films of uniform thickness are used, so that a comparison of the angles of slope at which the material begins to flow, is a comparison of the plastic properties of the materials. Since the shearing stress exerted on a lacquer applied to a vertical surface such as a wall, is the force of gravity, this force, in coatings of the usual thickness applied by ordinary brushing, is of a relatively low order of magnitude. In Fig. 3, typical flow shear curves for a series of viscous liquids is shown; it will be noticed that all of these curves pass through the origin. In Fig. 4, typical flow shear curves for materials showing plastic properties are shown; it will be noticed that all of these curves show zero flow at some point outside the origin of the shearing stress line. Such point is the limit of perfect elasticity. It will be further noticed that the upper parts of these curves are substantially straight lines, whereas the lower part is a curve having less slope than the upper part of the curve. This clearly shows that in the lower ranges an appreciable variation of the shearing stress has a relatively slight effect on the rate of flow.

In most cases it is desirable to have a brushing lacquer flow sufficiently after application to "level out", in order that brush marks will not remain after the lacquer has dried. In other cases, as for example, in lacquers to be used for "stippling" it is desirable that substantially no flow whatever take place after the lacquer has been applied. By our process, we are able to obtain either of the above effects at will, since it enables the users of the process to control flow of lacquers with great accuracy. Furthermore, the use of our process now makes it possible to produce lacquers which are slow drying and easily brushed, without, at the same time, flowing excessively after being applied to vertical surfaces.

Where we desire to produce a lacquer having just sufficient flow to enable it to "level out" after application, but at the same time have the flow so limited that no "curtains," "sags", "runs". etc. will be formed before the lacquer is dried, we prepare a lacquer which at the shearing stress of the gravitational force exerted on the wet film, has an extremely slow rate of flow. In other words, when the lacquer is at first applied, and for some time thereafter, its yield value is only slightly less than the shearing force, as for example, between the points A and B or A' or B' in Fig. 4:

It will be understood that the rate at which the lacquer dries is the limiting factor of the distance over which it will flow at a given rate. For example, a lacquer which flows at the average rate of .001 inch per minute on a vertical surface, when applied as a coating of ordinary thickness (about .003 to .006 inch) will flow .01 inch in 10 minutes and .02 inch in 20 minutes. It is usually desirable, therefore, that this rate of flow be adjusted so that it is of sufficient magnitude to fill in and cause the brush marks to disappear before the lacquer film is dry.

In the instrument described above and illustrated in Figs. 1 and 2, we have found that a lacquer film .015 to .02 inch in thickness is convenient. In the examples and data hereinafter given a gauge .018 inch in thickness was used for regulating the thickness of the lacquer (B Fig. 1) placed upon the glass plate (C Fig. 1). In most cases, in order to shorten the time required for actually taking a measurement, the angle of slope is measured at which the surface of the lacquer moves at the rate of .001 inch per minute, as observed under the microscope. For most work this dynamic method is to be preferred to a static measurement, since the exact maximum angle at which no movement occurs may require several hours for determination.

The apparent viscosities hereinafter given were measured on a Stormer viscometer, whose constant was 25.05, when the load was between 100 and 500 grams. The viscosity as herein given is in terms of seconds required for 100 revolutions of the cylinder with the load specified. From the data, the viscosity in centipoises may be calculated for any given load from the following formula:

$$n = \frac{WT}{C}$$

Where n=viscosity, W=load in grams, T=time in seconds and C=25.05 which is the constant for the instrument.

In order to make our invention clear the following more detailed description of our process is given by way of illustration. It is to be clearly understood, that we do not wish to be limited thereby, since it will be obvious to those skilled in the art that variations in the procedure, materials used, and in the proportions of materials may be made without departing from the spirit of the invention.

EXAMPLE I

The following lacquer may be considered as a typical brushing lacquer, such as is now on the market, which dries to a non-tacky condition in about 10 to 20 minutes.

|  | Parts |
| --- | --- |
| Nitrocellulose | 35 |
| Alcohol | 13 |
| Dibutyl phthalate | 15 |
| Castor oil | 3 |
| Phthalic acid—glycerol resin | 40 |
| Xylol | 225 |
| Butanol | 25 |
| Ethylene glycol mono butyl ether | 30 |
| Ethylene glycol mono ethyl ether | 30 |
| Titanium dioxide | 68 |

Where a grade of nitrocellulose known as "¼ sec. viscosity regular soluble nitrocellulose" was used in the above formula, the lacquer had the following viscosity characteristics:

| W | T=time in seconds | n=Vis. in centipoises |
| --- | --- | --- |
| 200 grams | 63.2 | 504. |
| 300 grams | 40.7 | 487. |
| 400 grams | 30.2 | 510. |

When such a lacquer is applied to a vertical surface in a sufficiently heavy coat to secure good hiding, it begins to flow, resulting in the formation of sags, curtains and runs, which mar the appearance of the finish, and renders the application of the lacquer extremely difficult.

When a test is made of the above lacquer on the instrument for measuring plasticity characteristics, described above and illustrated diagrammatically in Figs. 1 and 2, it is found that flow takes place at a slope that is too small for measurement, i. e. the lacquer flows at an angle of less than one second of arc.

In order to render the above lacquer a plastic body, having plasticity characteristics which prevent its flow when applied to a vertical surface, we add thereto a metallic salt of a fatty acid having not substantially less than 12 carbon atoms. The amount required will vary according to the nature of the salt, but the amount added should be sufficient to prevent a surface flow at a rate greater than .001 of an inch per minute when a film .018 of an inch in thickness is tipped at an angle of 10 minutes of a degree from the horizontal.

The metal soap must be thoroughly dispersed in the lacquer if the best results are to be obtained. This dispersion may be obtained by any convenient method, as by grinding, or the use of a colloid mill. In many cases, the soap may be dissolved or dispersed in one or more of the solvents, which may then be heated, and the hot solution added to the remainder of the lacquer. The exact amount is determined by the results desired, the nature of the heavy metal soap used, and the solvents employed, as will be hereinafter shown.

We are aware that such materials as aluminum and zinc stearate, and palmitate, aluminum and zinc resinate, magnesium carbonate, etc., have been used as transparent or semi-transparent pigments in clear lacquers to produce a non-glossy "flat" or "rubbed effect" in clear lacquers for spray application; and although aluminum and zinc resinate and magnesium carbonate are widely used for producing flat lacquers they do not produce plastic properties of sufficient magnitude to be useful in our invention. To the best of our knowledge, heavy metal soaps, such as we describe herein, have never been designedly employed in the manner and with a solvent of such a nature as to produce a lacquer which dries at a sufficiently slow rate as to permit easy application by means of a brush and at the same time not sag or run after being applied on a vertical surface. As far as we are aware, the fact that metallic soaps of fatty acids produce plastic properties in lacquers of sufficient magnitude to prevent excessive flow after application has not heretofore been known. Furthermore, the desirability and usefulness of a lacquer having plastic properties for brush application has been unknown prior to our invention.

In order that the invention may be better understood, the following table is given to illustrate the effect of various amounts of calcium stearate on the plastic properties of a lacquer having the composition given in Example I.

sidered to have close to the maximum rate of drying that is satisfactory for brush application. Most painters object to the use of a lacquer that dries in ten minutes to a tack free condition, for brush application to large surfaces, such as plaster walls. Example II represents a lacquer which dries more slowly, and may be considered as an example of a lacquer having a satisfactory drying rate for use on large surfaces, such as walls and other surfaces of relatively large areas. It may be brushed for about ten minutes without excessive dragging under the brush.

EXAMPLE II

| | Parts by weight |
|---|---|
| Regular soluble nitrocellulose | 80 |
| Denatured alcohol | 30 |
| Dibutyl phthalate | 36 |
| Blown castor oil | 20 |
| Ester gum | 72 |
| Butyl lactate | 240 |
| Petroleum naptha boiling from 275 to 400° F. | 340 |
| Titanium oxide | 200 |
| Calcium stearate | 30 |

There is some variation in calcium stearate and also in other metal soaps produced by different manufacturers, and as a matter of fact,

| Grams of lacquer | | 925 | 925 | 925 | 925 | 925 | 925 | 925 | 925 | 925 | 925 |
|---|---|---|---|---|---|---|---|---|---|---|---|
| Gms. of calcium stearate | | None. | 5 | 10 | 20 | 30 | 40 | 50 | 60 | 75 | 100 |
| | Wt. of load on viscometer | | | | | | | | | | |
| Viscosity in seconds time | 200 grams | 63.2 | 49.6 | 56.9 | 55.1 | 62.2 | 60.9 | 56.1 | 50.5 | 50.1 | 60.5 |
| | 300 grams | 40.7 | 32.7 | 37.9 | 36.2 | 39.7 | 39.5 | 35.7 | 31.8 | 31.0 | 35.3 |
| | 400 grams | 30.2 | 24.6 | 27.8 | 26.2 | 29.6 | 28.8 | 25.7 | 23.1 | 22.3 | 25.0 |
| Angle at which surface of lacquer film 0.018 in. thick flowed 0.001 in. per minute | | not measurable | less than 5" | 30" | 1' | 4' | 6' | 12' | 95' | 238' | 545' |
| Angle at which lacquer showed no flow | | | | | | | | 8' | | | |

It will be noticed that the viscosities of the above lacquers as measured on a Stormer viscometer are substantially the same, the variations being due, for the most part, to differences in evaporation in the solvent during the grinding operation.

The calcium stearate was added in the above examples, by mixing with the titanium oxide and grinding the pigment and calcium stearate into the lacquer.

If the amount of calcium stearate is plotted against the angle at which the material flows .001 inch per minute, when .018 in. thick, a curve is obtained as shown in Fig. 5 of the drawings.

It will be noticed that in this case (Fig. 5) there is a sharp or critical break in the curve occurring between 40 and 60 grams of calcium stearate per 925 grams of lacquer. When the above lacquers are brushed on a vertical surface, bad runs, sags and/or curtains, are obtained in all lacquers containing less than 40 parts by weight of calcium stearate, in each 925 parts of lacquer. There is substantially no sagging of a brush coat of this lacquer on a vertical surface when 40 or more parts of calcium stearate is properly dispersed in each 925 parts of lacquer. With more than 75 parts of calcium stearate, substantially no flow occurs, the brush marks remain, and the lacquer may be stippled.

The lacquer given in Example I might be conbetween batches produced by the same manufacturer. In general, we have found that between 25 and 50 parts by weight of heavy metal soap per 1000 parts of lacquer exclusive of pigment is sufficient to prevent sagging, running, and the formation of curtains. Where it is desired to produce a lacquer of the above formula capable of being stippled, 75 to 100 parts of calcium stearate is preferred in the formula given above.

EXAMPLE III

The following table shows the weight of one sample of each of the various salts of aliphatic acids required in 1000 grams of the lacquer described in Example II to prevent the formation of runs, curtains or sags when 15 grams is spread over an area of 165 square inches of vertical surface.

| | Grams |
|---|---|
| Aluminum stearate | 25 to 30 |
| Calcium stearate | 35 to 40 |
| Zinc stearate | 60 to 70 |
| Magnesium stearate | 55 to 65 |
| Lead stearate | 60 to 70 |
| Aluminum palmitate | 25 to 30 |
| Calcium palmitate | 35 to 45 |
| Zinc palmitate | 30 to 35 |
| Magnesium palmitate | 45 to 50 |
| Zinc laurate | 35 to 45 |

| | Grams |
|---|---|
| Zinc oleate | 40 to 50 |
| Magnesium oleate | 35 to 45 |
| Lead oleate | 45 to 55 |
| Calcium linoleate | 30 to 35 |
| Zinc linoleate | 30 to 35 |

Zinc and aluminum resinate, and stearic and palmitic acids when used in lacquers do not produce sufficient plasticity for our purpose.

Some of the soaps listed above show a tendency to cause yellowing when used in white lacquers. The calcium soaps, on the other hand, give evidence of actually preventing yellowing. For white or light colored lacquers, therefore, we prefer to use calcium soaps.

It is, of course, to be understood that where coats of less thickness are to be applied, the shearing force of gravity will be less, and a less amount of soaps will be required. As has been hereinbefore mentioned, the products given in the above table as produced by different manufacturers vary somewhat in their power to produce plastic properties in lacquers, and there may be variations from batch to batch in a material made by the same manufacturer. Variations also occur when the same plasticity producing agent is used in lacquers of different solvent composition. The solvent mixture should be capable of partially dissolving and/or forming a jell with the metallic soap in the presence of the cellulose ester or ether base and its modifying agents. In general the use of hydrocarbons in the solvent mixture is desirable, and lacquers containing appreciable amounts of hydrocarbons require smaller amounts of metallic soap to produce a given yield value. Alcohols, especially alcohols of low molecular weight, have a tendency to lower the yield value, and render some of the soaps less effective. In general, however, we have found that an amount of plasticity producing agent at least equal to 1.75% of the weight of the lacquer (exclusive of pigment) is required to prevent the formation of curtains in a lacquer which requires more than 10 minutes to dry tack free as measured by the Dry-O-Graph at 70° C. under ordinary conditions of ventilation. The Dry-O-Graph mentioned above is an instrument for measuring the time required for the drying of finishing materials, the name being registered as Trade Mark No. 286,784, September 1, 1931.

It is known that there is somewhat less tendency for the formation of sags and curtains when a finish is applied to a vertical surface with vertical rather than with horizontal brushing. This fact should be taken into consideration in making tests, so that unless it is definitely known that the lacquer is to be applied by vertical brush strokes, brushing tests should be made by brushing horizontally and sufficient plasticity producing agent used to prevent sagging under the conditions of actual use.

Example IV

For outside use, it is sometimes desirable to use a lacquer that is even slower drying than that given under Example II. Heretofore it has been impossible to produce such a lacquer capable of being applied to vertical surfaces without excessive flow with a resulting formation of runs, sags, curtains, etc. The following formula will produce a lacquer ordinarily requiring from 10 to 24 hours for drying (Dry-O-Graph) to a non-tacky condition, depending upon the temperature, and air currents existing at the surface of the lacquer coating.

Since the solvents or this lacquer have such a low rate of evaporation, it may be conveniently made up as a clear vehicle, and the pigment ground in this vehicle in the same manner as is now employed in the manufacture of paint and varnish enamels.

Clear lacquer vehicle

| | |
|---|---|
| Reg. soluble alcohol wet nitrocellulose containing 40 parts alcohol and 100 parts of dry nitrocellulose | 3 lbs. 5 oz. |
| Dibutyl phthalate | 1 lb. |
| Blown castor oil | 12 oz. |
| Phthalic acid-glycerol modified resin | 2 lbs. 2 oz. |
| Oleum spirite | 5 lbs. 12 oz. |
| Butyl ether of diethylene glycol | 11 lbs. |
| Ethyl ether of diethylene glycol | 6 lbs. |
| Coal tar naphtha boiling between 130 and 190° C. | 6 lbs. |

A white enamel which does not sag when applied to vertical surfaces may be made from the above vehicle in the following manner:

| | |
|---|---|
| Clear lacquer vehicle | 800 parts by weight |
| Titanium oxide | 125 parts by weight |
| Aluminum or calcium stearate | 30 to 100 parts |

The titanium oxide and aluminum or calcium stearate is ground in the clear vehicle by any of the well known methods used for grinding such as in a pebble mill, roller mill, burr stone mill or colloid mill.

Where from 30 to 50 parts of aluminum or calcium stearate are used, the lacquer does not run, sag, or curtain, when a coat of ordinary thickness is brushed on a vertical surface. When from 75 to 100 parts of calcium or aluminum stearate are used, the coating may be stippled, and the stipple marks remain distinct.

Example V

Cellulose acetate lacquer

| | Parts by weight |
|---|---|
| Cellulose acetate | 74 |
| Toluene ethyl sulfonamid | 60 |
| Acetone | 32 |
| Methyl cellosol | 384 |
| Ethyl lactate | 160 |
| Denatured alcohol | 90 |
| Titanium dioxide | 125 |
| Calcium stearate | 25 |

The above lacquer dries tack free in 20 minutes and print free in 50 minutes as measured on the Dry-O-Graph. When brushed on a vertical surface, as described in Example II, it does not run, sag, or form curtains.

Example VI

Cellulose ether lacquer

| | Parts by weight |
|---|---|
| Ethyl cellulose | 120 |
| Tricresyl phosphate | 20 |
| Resin | 60 |
| Xylol | 450 |
| Ethyl lactate | 50 |
| Butyl ether of ethylene glycol | 90 |
| Titanium oxide | 150 |
| Aluminum stearate | 25 |

The cellulose ethers are compatible with a wide variety of resins and plasticizers, so that there is considerable latitude in their formulation. A lacquer of the composition given in Example VI wherein a phthalic acid glycerol resin was used, dried tack free in 20 minutes and print free in 80 minutes as measured on the Dry-O-Graph. Since relatively large amounts of hydrocarbons may be used in the solvents employed for cellulose ether lacquers, it is possible to secure sufficient plastic properties to prevent running and sagging on vertical surfaces with relatively small proportions of metal soaps, as hereinbefore explained.

In the foregoing examples, titanium oxide is shown as the pigment, but this is for mere sake of convenience. Titanium oxide was used in many of the experiments because of ease of grinding and because movements on the surface of a white background are easily observed. Other pigments and coloring agents may be used as is well understood in the art.

In the preferred embodiment of our invention, we prefer to use solvents having a relatively low rate of evaporation from the lacquer film. We prefer, therefore, to use solvents which evaporate at such a rate that the lacquer under ordinary conditions of application may be brushed on a vertical surface for a period of about 10 minutes without excessive pull under the brush. Lacquers made by our process are especially useful for application on relatively large vertical areas such, for example, as walls. For such uses a lacquer which dries tack free in not less than 10 minutes as measured on the Dry-O-Graph at 70° F. is preferable. The lacquers described in Examples II and IV illustrate nitrocellulose lacquers which dry at such rates as to make them especially useful for brush application on large vertical surfaces.

In ordinary brush application one gallon of lacquer such as those described in the examples is spread over an area of about 500 square feet. This is equivalent to an average thickness of 0.0032 of an inch. Our invention, therefore, provides lacquers having a limit of perfect elasticity at least equal to the force exerted by gravity at the surface of a film of lacquer 0.0032 of an inch in thickness when on a vertical surface. Most of the lacquers produced by our process exhibit thixotropic as well as plastic properties. This is highly desirable in many cases since it permits the lacquer to "flow out" sufficiently to cause brush marks to disappear, after which further movement stops. Wherein we use the term "limit of perfect elasticity", we mean the maximum yield value attained by the lacquer, including the solvents, on standing, rather than the minimum attained by violent agitation. Where stippling is to be carried out a higher limit of perfect elasticity is preferable, since it is desirable that no movement whatever occur after the lacquer is applied. For proper brush application the apparent viscosity as measured on the Stormer viscometer using a load of at least 200 grams should not be over 8 poises.

The term "plasticity" as herein used, is limited to its stricter scientific meaning, as employed, for example, by Bingham, cited above, who defines plasticity "as a property of solids in virtue of which they hold their shape permanently under the action of small shearing stresses, but they are readily deformed, worked or molded under somewhat larger stresses." The term "solid" as used in the above definition is explained by Clerk Maxwell in his "Theory of Heat" as follows:

"If the form of the body is found to be permanently altered when the stress exceeds a certain value, the body is said to be soft or plastic, and the state of the body when the alteration is just going to take place is called the limit of perfect elasticity. If the stress, when maintained constant, causes a strain or displacement in the body which increases continually with time, the substance is said to be viscous.

When this continuous alteration of form is only produced by stresses exceeding a certain value the substance is called a solid, however, soft it may be. When the very smallest stress, if continued long enough, will cause a constantly increasing change of form, the body must be regarded as a viscous fluid, however hard it may be".

While we have described our invention in the preferred form and have given various examples thereof, it will be understood that many changes may be made therein and in the examples given without departing from the spirit of the invention defined in the following claims.

We claim:

1. A lacquer suitable for brush application including a cellulose derivative dissolved in a slowly volatile organic solvent which evaporates at such a rate that a coating of the lacquer remains tacky for at least ten minutes, and a plasticity producing agent in at least the critical amount required to impart to the lacquer in its liquid phase plastic properties so as to substantially prevent the same from curtaining or sagging when said lacquer is applied to a vertical surface, said agent having relatively no softening effect on the lacquer film in its final dry condition.

2. A lacquer suitable for brush application comprising a base of a cellulose derivative dissolved in slowly voltatile organic solvents, said coating material having a viscosity of less than 8 poises, and a plasticity producing agent in at least the critical amount required to impart to the lacquer while in its liquid phase a limit of perfect elasticity at least substantially equal to the force exerted by gravity at the surface of a coating film 0.003 inches in thickness when on a vertical surface, said agent having relatively no softening effect on the lacquer film in its final dry condition.

3. A lacquer suitable for brush application comprising a base of a cellulose derivative dissolved in volatile organic solvents which evaporate at such a rate that a coating of the material does not dry tack free in less than ten minutes, and a plasticity producing agent in at least the critical amount required to impart to the liquid phase of said coating material a limit of perfect elasticity at least equal to the force exerted by gravity at the surface of a film 0.003 inches in thickness when on a vertical surface, said agent having relatively no softening effect on the film of said coating material in its final dry condition.

4. A lacquer suitable for brush application comprising a cellulose derivative dissolved in a volatile organic solvent which evaporates at such a rate that the coating remains tacky for at least ten minutes, and a salt of a fatty acid having substantially not less than 12 carbon atoms sufficient in amount to prevent the lacquer from curtaining or sagging when said lacquer is applied to a vertical surface.

5. A lacquer suitable for brush application comprising a cellulose derivative dissolved in a volatile organic solvent which evaporates at such a rate that the coating remains tacky for at least ten minutes, and a metal soap in an amount at least equivalent to 1.75 percent of the weight of the lacquer, exclusive of pigment, said metal soap being of such character as to substantially prevent curtaining or sagging of the lacquer.

6. A lacquer suitable for brush application comprising a cellulose ester dissolved in a volatile organic solvent which evaporates at such a rate that the coating remains tacky for at least ten minutes, and a metal soap in an amount at least equivalent to 1.75 percent of the weight of the lacquer, exclusive of pigment, said metal soap being of such character as to substantially prevent curtaining or sagging of the lacquer.

7. A lacquer suitable for brush application comprising cellulose nitrate dissolved in a volatile organic solvent which evaporates at such a rate that the coating remains tacky for at least ten minutes, and a metal soap in an amount at least equivalent to 1.75 percent of the weight of the lacquer, exclusive of pigment, said metal soap being of such character as to substantially prevent curtaining or sagging of the lacquer.

8. A lacquer suitable for brush application comprising a cellulose ether dissolved in a volatile organic solvent which evaporates at such a rate that the coating remains tacky for at least ten minutes, and a metal soap in an amount at least equivalent to 1.75 percent of the weight of the lacquer, exclusive of pigment, said metal soap being of such character as to substantially prevent curtaining or sagging of the lacquer.

9. A lacquer suitable for brush application including ethyl cellulose dissolved in a voltatile organic solvent which evaporates at such a rate that the coating remains tacky for at least ten minutes, and a metal soap in an amount at least equivalent to 1.75 percent of the weight of the lacquer, exclusive of pigment, said metal soap being of such character as to substantially prevent curtaining or sagging of the lacquer.

10. A non-sagging lacquer for brush application comprising cellulose nitrate, a plasticizer therefor and a resin dissolved in a volatile solvent, and a metal soap equivalent to at least 1.75 percent of the weight of said solution, said solvent evaporating at such a rate that the lacquer remains tacky for at least ten minutes, said metal soap being of such character as to substantially prevent curtaining or sagging of the lacquer.

11. A non-sagging lacquer for brush application comprising cellulose nitrate, a plasticizer therefor and a resin dissolved in a solvent including butyl lactate and a hydrocarbon, and containing at least 20 parts of a metal soap of a fatty acid of not less than twelve carbon atoms in 800 parts of said solution, and a coloring agent compatible therewith, said metal soap being of such character as to substantially prevent curtaining or sagging of the lacquer.

12. A slow-drying lacquer suitable for brush application comprising a cellulose derivative base, a volatile solvent having a slow rate of evaporation, and a metal scap of a fatty acid said lacquer having plastic properties and being non-flowing when applied as a coating.

13. The herein described process of making brushing lacquer comprising dissolving a cellulose derivative in an organic solvent having a relatively slow rate of evaporation and adding to the resulting solution a metallic soap of such character and in sufficient quantity to substantially prevent the formation of sags when said lacquer is applied as a coating to a vertical surface by means of a brush.

14. The herein described process of making brushing lacquers comprising dissolving a cellulose derivative, a plasticizer and a resin in an organic solvent having a relatively slow rate of evaporation and incorporating in the resulting solution a pigment and a sufficient quantity of a metallic soap of such character to substantially prevent flow at a rate greater than 0.001 of an inch per minute at an apparent viscosity of 5 poises when a film 0.003 inches in thickness is applied to a vertical surface.

15. The herein described process of making brushing lacquers comprising dissolving a cellulose derivative, a plasticizer and a resin in an organic solvent having a relatively slow rate of evaporation and adding to the resulting solution a pigment and an amount of metallic soap of such character and equivalent to at least 1.75 percent of the weight of said solution whereby a lacquer is produced having plastic properties sufficient to substantially prevent its sagging when brushed on a vertical surface.

16. The herein described method of preventing excessive flow when a slow-drying cellulose base lacquer is applied to a vertical surface which consists in dispersing in said lacquer an amount of heavy metal soap to produce plastic properties such that the limit of perfect elasticity is at least equal to the force of gravity acting at the surface of the coating.

17. A brushing lacquer comprising a cellulose derivative base, a slow drying solvent therefor, and a metallic soap of such character and in at least the critical amount to render the lacquer substantially non-flowing on vertical films of normal brushing thickness.

18. The herein described method of making brushing lacquer comprising dissolving a cellulose derivative in a relatively slow evaporating organic solvent, said solvent being also capable of forming a jell with a metallic soap in the presence of said cellulose derivative and incorporating a sufficient amount of the metallic soap to render the lacquer substantially non-flowing on vertical films of normal brushing thickness.

19. A coating material suitable for brush application comprising a base of a cellulose derivative dissolved in a slowly volatile organic solvent, and a plasticity producing agent in at least the critical amount required to impart to the liquid phase of the material plastic properties such that the surface of a coating film of said material 0.015 to 0.02 inches in thickness will not flow at a rate greater than 0.001 of an inch per minute when tipped at an angle of about ten minutes of a degree from the horizontal, said agent having relatively no softening effect on the film of said material in its final dry condition.

20. A coating material suitable for brush application comprising a base of a cellulose derivative dissolved in a slowly volatile organic solvent, and a metal soap of a character for imparting plastic properties to the material such that the surface of a coating film of said material 0.015 to 0.02 inches in thickness will not flow at a rate greater than 0.001 of an inch per minute when tipped at an angle of about ten minutes of a degree from the horizontal.

21. A coating material suitable for brush application comprising a base of a cellulose derivative dissolved in a slowly volatile organic solvent, and a salt of an organic acid having substantially not less than 12 carbon atoms and of a character for imparting plastic properties to the material such that the surface of a coating film of said material 0.015 to 0.02 inches in thickness will not flow at a rate greater than 0.001 of an inch per minute when tipped at an angle of about ten minutes of a degree from the horizontal.

22. A coating material suitable for brush application comprising a base of a cellulose derivative dissolved in a volatile organic solvent which evaporates at such a rate that the coating remains tacky for at least ten minutes, and a plasticity producing agent in at least the critical amount required to impart to the liquid phase of the material plastic properties such that the surface of a coating film of said material 0.018 inches in thickness will not flow at a rate greater than 0.001 of an inch per minute when tipped at an angle of about ten minutes of a degree from the horizontal, said agent having relatively no softening effect on the film of the material in its final dry condition.

23. A lacquer suitable for brush application comprising a cellulose derivative dissolved in a volatile organic solvent which evaporates at such a rate that the coating remains tacky for at least ten minutes, and a metal soap in an amount from 2.5 to 10 per cent of the weight of the lacquer, exclusive of pigment, said metal soap being of such character as to substantially prevent curtaining or sagging of the lacquer.

24. A slow-drying lacquer suitable for brush application comprising a cellulose derivative base, a volatile solvent having a slow rate of evaporation, and calcium stearate, said lacquer having plastic properties and being non-flowing when applied as a coating.

25. A slow-drying lacquer suitable for brush application comprising a cellulose derivative base, a volatile solvent having a slow rate of evaporation, and aluminum stearate, said lacquer having plastic properties and being non-flowing when applied as a coating.

WILLIAM COURTNEY WILSON.
CHARLES ELLIOTT FAWKES.